United States Patent [19]

Kagi, Sr.

[11] Patent Number: 5,041,274

[45] Date of Patent: Aug. 20, 1991

[54] METHOD AND APPARATUS FOR COOLING, NEUTRALIZING, AND REMOVING PARTICULATES FROM THE GASEOUS PRODUCTS OF COMBUSTION

[76] Inventor: Thomas Kagi, Sr., P.O. Box 3637, Moscow, Id. 83843

[21] Appl. No.: 579,318

[22] Filed: Sep. 7, 1990

[51] Int. Cl.⁵ ............................................. B01D 47/00
[52] U.S. Cl. ........................................ 423/242; 55/73; 55/89; 55/228; 55/260; 55/94; 261/116; 261/DIG. 9
[58] Field of Search ................. 55/89, 73, 93, 94, 228, 55/260; 423/242; 261/116, DIG. 9

[56] References Cited

FOREIGN PATENT DOCUMENTS 491352  5/1919  France .................................. 261/116

Primary Examiner—Bernard Nozick

[57] ABSTRACT

The present invention discloses a method and apparatus for cooling and removing the toxic particulates, heavy metals, noxious fumes, and acid from the gaseous products of the combustion of materials high in impurities and/or toxic substances. Said invention accomplishes the above when dense exhaust and smoke emitted by a furnace are drawn through a series of three treatment chambers by the tremendous vacuum effect of extremely high-velocity vertical water and alkaline solution jets. The hydraulic pressure of the water and alkaline solution jets, in addition to providing draft, forces impurities in the gaseous waste to hydraulically dilute or dissolve in a turbulent liquid bath below. The apparatus improves the efficiency of any furnace to which it is attached by channeling exhaust-heated water through an external radiator, thereby supplementing the heat output of the furnace to which the device is attached.

3 Claims, 1 Drawing Sheet

METHOD AND APPARATUS FOR COOLING, NEUTRALIZING, AND REMOVING PARTICULATES FROM THE GASEOUS PRODUCTS OF COMBUSTION

BACKGROUND

Cooling, neutralizing, and purifying the gaseous products of combustion poses a serious world-wide challenge. Alternative fuels, such as waste oil (and other used petroleum based substances), tires, wood, and coal, although ideal furnace fuel in that they are inexpensive and abundant, emit large amounts of dense, toxic pollutants when burnt. In this era of "acid rain", "global warming", and record smog levels, the emission of such pollutants is recognized as contributing to problems that are detrimental to all living things.

Waste oil furnaces, tire burners, and wood and coal stoves have been banned in some areas due to the high levels of dense and toxic pollutants, including NOx and SO2, given off by these devices. The 1990 Clean Air Act approved by Congress establishes even more stringent air quality standards. Addressed in the 1990 Clean Air Act is the problem of "acid rain" which is caused primarily by the emission of acidic gaseous waste products of fossil fuel combustion.

In addition, waste oil is not easily and economically disposed of by means other than combustion. Alternatives to burning waste oil for heat, generation of power, etc., include illegal dumping and underground or underwater storage methods, all of which pose the threat of contaminating soil and water supplies.

The economical disposal of used tires is also somewhat limited to combustion, as tire piles present a serious fire hazard, promote the breeding of insects and disease, and are not easily buried due to their tendency to "float" to the surface.

Wood and coal stoves both serve as inexpensive alternatives to electric or gas heat.

Methods and apparatus for cleansing and neutralizing combustion fumes are well known to those skilled in the art. Some examples are L. J. Kinney, July 28, 1970, U.S. Pat. No. 3,522,000, B. E. Arnesjo, Oct. 6, 1970, U.S. Pat. No. 3,532,595, and Holl, Mar. 11, 1975, U.S. Pat. No. 3,870,082.

The above mentioned prior art discloses that it is well known toxic fumes can be treated by a method of stages to remove suspended particles.

Both the Kinney and Holl patents et. al. disclose the use of a series of screens, barriers, and baffles wetted by a water mist to trap and collect solid particles suspended in combustion fumes. These arrangements have a serious limitation, especially in the case of scrubbing waste oil combustion exhaust, as waste oil may contain up to 20% contaminants. Waste oil and tire combustion emissions contain unusually large, dense, particulates which would quickly clog and obstruct any such physical barrier or filtering device. This situation would be exaggerated by spraying any such filters or screens with a water mist, thereby causing the heavy particulates to become viscous, as is the case with both the Kinney and Holl devices.

Prior apparatuses, such as the Holl and Kinney devices, have disclosed methods of capturing particulates in exhaust by means of contacting the fumes with a fine water mist spray, thereby causing the particulates to coalesce onto water droplets. These particle-laden droplets are collected onto a baffle, plate, screen, or other such physical barrier, and allowed to drip into a pool of water below. Such methods are exclusively effective on fumes containing sub-micron particles and not for use with dense, particulate-heavy exhaust. Such methods would not actively capture and dilute or dissolve dense particulates, and would cause clogging and inefficiency in the apparatus.

Neither the Holl nor the Arnesjo models disclose a method of slowing and removing large debris from exhaust fumes prior to entering the water-related aspects of the apparatus. Thus, even the largest particles would be allowed to enter these devices and clog the barriers, screens, filters, and pumps.

Because the Kinney and Holl models utilize a method of physical barriers which obstruct the flow of exhaust through the devices, draft boosters such as the large fans disclosed by Kinney and centrifugal draft booster disclosed by Holl, are required to force gases through the cleansing apparatus and to avoid overheating, possibly damaging the device, or creating a fire hazard.

The Holl patent discloses a method of physical barrier filters, but does not provide adequate draft or cooling to accept the combustion fumes of materials such as waste oil and tires. Using the Holl design to cleanse such super-heated exhaust would result in the apparatus quickly overheating, risking damage to the apparatus and presenting a serious fire hazard.

The Holl model in particular lacks an accurate method of controlling the temperature of the accumulated water in the bottom of the device. Super-heated exhaust entering the apparatus could quickly cause the water to boil; the only method for cooling the accumulated water is to add fresh tap water and dispose of the heated waste water, diminishing the efficiency of the furnace to which the apparatus is attached and increasing costs associated with water consumption.

Neutralization of waste oil exhaust fumes with alkalines such as ammonium hydroxide and calcium hydroxide would not be effective in the Holl or Arnesjo models as the temperatures within these apparatuses could not be accurately maintained at a predetermined level for such neutralizing reagents to remain in solution.

Calcium hydroxide is an inexpensive, accepted, and active substance used to neutralize sulfur dioxide and nitrous oxide. The solubility of calcium hydroxide decreases with an increase in the temperature of an aqueous calcium hydroxide solution.

Ammonium hydroxide, another alkaline used to neutralize sulfur dioxide and nitrous emissions, will be separated out of an aqueous solution by boiling.

Therefore, it is important that the temperature inside such an apparatus be monitored and accurately controlled so that the neutralizing reagents remain in solution.

Waste oil burns in excess of 2200 degrees Fahrenheit. It is typical for the exhaust emitted by waste oil furnaces to exit the furnace at 900 to 1000 degrees Fahrenheit. Tires burn in excess of 3000 degrees Fahrenheit. Such intense temperatures require an exhaust scrubber to have an extremely strong draft and effective cooling mechanism to prevent damage to the apparatus and to avoid creating a fire hazard.

Water is capable of absorbing far more calories than metal or air and is preferable for use in cooling; the Holl and Kinney models depend primarily on metal casing and air draft, rather than water, to cool super-heated exhaust. The Arnesjo model does not attempt to cool combustion fumes.

Neither the Kinney, the Arnesjo nor the Holl apparatuses attempt to utilize combustion exhaust-heated water to increase the efficiency of the furnace to which it is attached. The heat of the exhaust is "wasted" by the Holl and Kinney apparatuses as the fumes simply pass through the unit and are not utilized for any valuable purpose.

Waste oil furnaces, tire burners, and wood and coal stoves are typically small in size and are utilized, in large part, for their cost effectiveness to individuals and businesses for whom the use of such devices is economical as compared to other sources of heat. Thus, the subject invention would only be practical if it could be produced for a reasonable price, easily maintained and cleaned, and accommodated in a relatively small amount of space.

The Arnesjo model would have to be relatively tall to be effective as each set of jet nozzles therein is located one on top of the other and would require space for mixing and leaching. Draft in the Arnesjo model is dependent on the natural tendency for hot air to rise and on a large amount of air space through which the exhaust may travel. Therefore, the Arnesjo device could not be significantly reduced in size and still maintain efficiency. This apparatus was specifically engineered for the purpose of producing hot water and was not designed for scrubbing, cooling or neutralizing dense, high-particulate emissions. The Arnesjo device would be expensive to manufacture due to the size and number of pumps, the very large and cumbersome size of the apparatus, and the difficultly of cleaning and maintaining the unit, making it impractical and cost-prohibitive for the average alternative furnace owner.

SUMMARY

The subject invention presents a method and apparatus for cleaning, purifying, and neutralizing the gaseous products of combustion by first directing combustion exhaust into a chamber where it immediately encounters one or more metal baffles causing the heaviest particulates in the exhaust to slow and drop to the bottom of the chamber. Second, the exhaust enters the stage two chamber through a connection tube where it encounters an extremely high-velocity, high-pressure, vertical water jet which cools the exhaust, causes impurities in the exhaust to hydraulically dilute or dissolve in a turbulent water bath at the bottom of the chamber, and creates a strong vacuum effect which draws exhaust through the apparatus without the use of draft boosters. The gases then travel up and into the tube connecting the stage two chamber with the stage three chamber. Directly inside the entrance of this second connection tube is another extremely high-velocity, vertical water jet which serves to further cool the exhaust, remove impurities and generate additional draft. Water accumulated at the bottom of the stage two tank enters a high-velocity, high-pressure water pump where it is recirculated, first through an external radiator where it releases heat into the surrounding room, thus supplementing the heat output of the furnace to which it is attached, and then back to water jet nozzles creating said high-velocity water jets. Gases in the stage two chamber then travel through the second connection tube to the stage three chamber where another extremely high-velocity vertical jet meets the gases. This jet contains an alkaline solution which serves to neutralize the exhaust in addition to cooling and purifying the gases while generating additional draft. The low temperatures at this stage of the apparatus make the use of any number of neutralizing alkaline solutions feasible.

The third and final connection tube links the stage three chamber with the outdoors. Directly inside this connection tube is another extremely high-velocity, vertical alkaline solution jet which serves to provide further neutralization, cooling, purification, and draft. Exhaust exiting the apparatus is approximately 99% free of impurities and at a temperature of 70 degrees Fahrenheit. Byproducts in the water resulting from the process of scrubbing the exhaust are biodegradable, and sufficiently diluted to be safe for entry into city sewer systems.

DESCRIPTION OF THE PREFERRED EMBODIMENT

Figure 1:
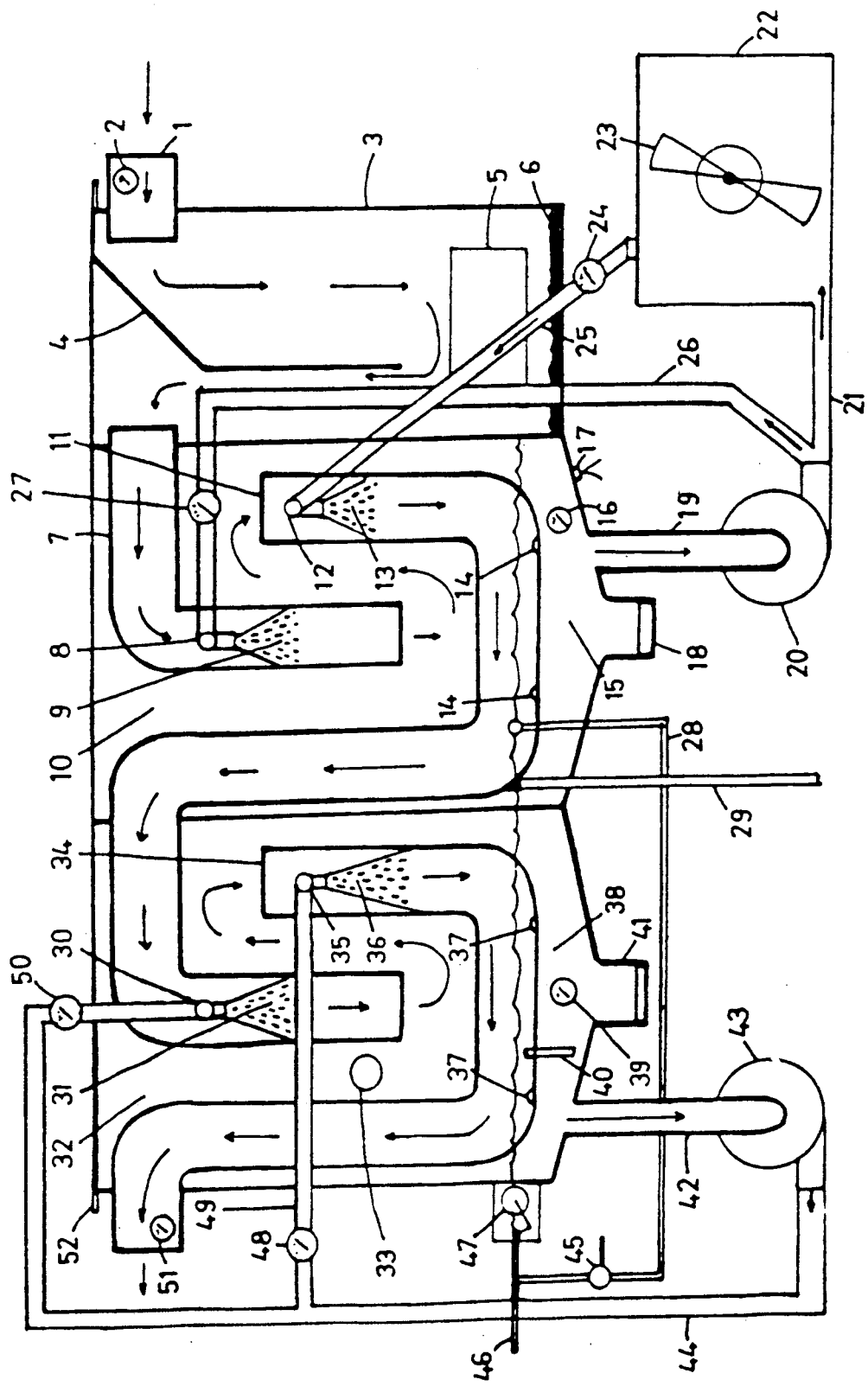
FIG. 1 is a perspective view of the preferred embodiment of the invention.

FIG. 1 discloses an apparatus for cooling, purifying and neutralizing the gaseous byproducts of combustion. Exhaust emissions enter the apparatus through the exhaust inlet collar 1. The entering exhaust temperature is monitored by a temperature gauge 2. The exhaust then enters the stage one chamber 3. The exhaust is immediately forced against a baffle barrier 4, which causes dust and heavy particulates to slow and fall to the bottom of the stage one chamber. Accumulated dust and particulates at the bottom of the stage one chamber 3, can be removed through an access door 5. Accumulated dust and particulates are shown at 6. The hot exhaust then rises up behind the baffle barrier 4 and enters the tube 7 that connects the stage one chamber with the next chamber. A water discharge nozzle 8 is located directly inside the entrance of this connection tube 7. This water discharge nozzle 8, directs an extremely high-velocity, vertical water jet 9 toward the bottom of the stage two chamber 10. This extremely high-velocity, vertical water jet 9, serves to cool the super-heated exhaust, hydraulically force impurities in the exhaust to dilute or dissolve and create a strong vacuum effect which pulls exhaust through the apparatus. The exhaust then rises and enters the tube 11 connecting the stage two chamber 10 with the next chamber. A second discharge nozzle 12 and extremely high-velocity, vertical water jet 13 is located directly inside the entrance of this connection tube 11. This second extremely high-velocity, vertical water jet 13 serves to further cool, purify, and neutralize the noxious gases while creating additional draft to pull exhaust through the apparatus. Water accumulating from the second vertical water jet inside the tube 11 connecting the stage two chamber 10 with the next chamber is allowed to drain through two holes 14 in the horizontal stretch of the tube 11 which is partially submerged in a water bath 15 at the bottom of the stage two chamber 10. This accumulated water bath 15, now heated and containing impurities from the exhaust is monitored by a temperature gauge 16 and by a temperature sensor 17, both located at the base of the stage two chamber 10. The stage two chamber 10 is tapered down to a water drain valve 18 for cleaning and/or emptying the stage two chamber 10. A feed pipe 19 conveys the accumulated heated water containing impurities 15 from the stage two chamber 10 to a high-velocity, high-volume, centrifugal pump 20.

The heated water 15 is then directed through a pipe 21 to an external radiator 22 which serves to release heat from the water into the surrounding room, thus supplementing the heat output of the furnace to which the scrubber is attached. When the temperature sensor 17 determines that the water bath 15 has reached a predetermined temperature, the sensor will cause a fan 23 on the external radiator 22 to turn on, thereby forcing additional heat away from the apparatus and into the surrounding room. Pressurized water exiting the radiator is monitored by a pressure gauge 24. The water from the radiator 22 is conveyed through a pipe 25 to the water discharge nozzle 12 located directly inside the opening of the tube 11 that connects the stage two chamber 10 with the next chamber, thereby creating water jet 13.

Another pipe 26 also conveys pressurized water from the centrifugal pump 20, past a pressure gauge 27, to the water discharge nozzle 8 located inside the tube 7 that connects the stage one chamber 3 with the stage two chamber 10.

Cool tap water enters the stage two chamber 10 through a water pipe 28 which works in conjunction with a drain pipe 29 to maintain the water 15 accumulated in the bottom of the stage two chamber 10 at a predetermined level.

The exhaust then travels through the 11 connection tube, into the next chamber, until it encounters a third discharge nozzle 30 emitting a high-velocity, vertical, alkaline solution jet 31, which serves to further cool, purify, and neutralize the acidic exhaust fumes while creating additional draft. The alkaline solution jet 31 is directed toward the base of the stage three chamber 32. The alkaline solution is added to the stage three chamber 32 through a port opening 33 by a remote, automatic, alkaline feeder. The exhaust then rises to enter the tube 34 connecting the stage three chamber 32 with the outdoors. The exhaust immediately encounters a discharge nozzle 35 which emits another extremely high-velocity, vertical alkaline solution jet 36. Liquid accumulating from the second vertical alkaline solution jet 36 inside the tube 34 connecting the stage three chamber 32 with the outdoors is allowed to drain through two holes 37 in the horizontal stretch of the tube 34 which is partially submerged in an alkaline solution bath 38 at the bottom of the stage three chamber 32. This water bath 38 is monitored by a temperature gauge 39 and by Ph sensor 40, both located at the base of the stage three chamber 32. The stage three chamber 32 is tapered down to a water drain valve 41 for cleaning and/or emptying the stage three chamber 32. A feed pipe 42 conveys the accumulated alkaline solution 38 from the stage three chamber 32 to a second high-velocity, high-volume, centrifugal pump 43. A pipe 44 conveys the pressurized alkaline solution away from the centrifugal pump 43.

A gate valve 45 is located off the main external water inlet pipe 46 to control water flow through said water pipe 28 to the stage two chamber 10.

Cool tap water enters the stage three chamber 32 through the main external water inlet pipe 46, past a float assembly 47 which maintains the accumulated alkaline solution 38 at a predetermined level.

The pressurized alkaline solution flowing through pipe 44 passes a pressure gauge located at 48 before it encounters the 35 discharge nozzle thereby creating the high-velocity vertical alkaline jet located at 36.

The pressurized alkaline solution flowing through pipe 44 also continues up and past pipe 49 to a pressure gauge 50 and through the discharge nozzle 30, thereby creating the high-velocity, vertical alkaline jet located at 31.

The exhaust then rises where it enters connection tube 34, drawn by the vacuum effect of alkaline solution jets 31 and 36. The exhaust then flows through tube 34, past a final temperature gauge 51 and exits the apparatus.

The apparatus may be installed on the floor or on the ceiling through ceiling mount brackets 52.

Exhaust exiting the apparatus is approximately 99% free of contaminants and at a temperature of approximately 70 degrees Fahrenheit. Byproducts in the water resulting from the process of scrubbing the exhaust are biodegradable, and sufficiently diluted to be safe for entry into city sewer systems.

The subject invention may be altered in numerous ways to accommodate individual situations; the apparatus is easily and effectively enlarged for use with a stack or miniaturized for use with a small stove or furnace. The size and number of chambers, high-velocity water jets, pumps, and connection tubes may be increased or decreased for such purposes. The three chambers may be either arranged in a tandem design or a square design, with a chamber occupying three corners of a square, and pumps, valves, and controls occupying the fourth corner. One or all of the treatment chambers may be repeated in a single apparatus.

The high-velocity water and alkaline solution jets may be arranged vertically, horizontally, or in a combination of both, to meet individual size specifications.

The connection tubes may be square, round or rectangular in shape.

I claim:

1. A method for cooling, neutralizing, and removing particulates from the gaseous products of combustion, comprising the steps of:
    A. Feeding said products of combustion into an initial treatment chamber wherein solid particles in said products of combustion are slowed by a baffle and allowed to precipitate onto the bottom of said treatment chamber;
    B. Drawing said products of combustion through a connection tube into a second treatment chamber by the tremendous cooling and vacuum effect created by an extremely high-pressure, high-velocity water jet located inside the first connection tube;
    C. Bombarding said products of combustion with said water jet causing said products of combustion to hydraulically dilute or dissolve in a turbulent accumulated water bath located at the bottom of the second chamber;
    D. Drawing said products of combustion through a second connection tube by the tremendous vacuum and cooling effect created by an extremely high-pressure, high-velocity water jet located inside the entrance of a second connection tube;
    E. Further bombarding said products of combustion with said second water jet, forcing said products of combustion to cool and hydraulically dilute or dissolve in said turbulent water bath located at the bottom of the second chamber.
    F. Conveying said accumulated water to an extremely high-velocity, high-pressure centrifugal pump and recirculating said pressurized water, first through an external radiator, thereby cooling the water and supplementing the heat output of the furnace to which said invention is attached, then to two water nozzles forming the first and second high-velocity water jets;

G. Drawing exhaust through the second connection tube from the second treatment chamber to the third treatment chamber by the cooling and tremendous vacuum effect of a high-velocity, high-pressure alkaline solution jet located in the end of the tube connecting the second treatment chamber with the third treatment chamber;

H. Bombarding and neutralizing said products of combustion with the first alkaline solution jet causing said products of combustion to neutralize and hydraulically dilute or dissolve in a turbulent accumulated alkaline solution bath located at the bottom of the third chamber;

I. Drawing said products of combustion through a third connection tube by the tremendous vacuum and cooling effect created by an extremely high-pressure, high-velocity alkaline solution jet located inside the entrance of the third connection tube;

J. Bombarding and neutralizing said products of combustion with the second alkaline solution jet causing said products of combustion to neutralize and hydraulically dilute or dissolve in a turbulent accumulated alkaline solution bath located at the bottom of the third chamber;

K. Conveying said accumulated alkaline solution to an extremely high-velocity, high-pressure centrifugal pump and recirculating said pressurized alkaline solution, to two water nozzles forming the first and second high-velocity alkaline solution jets.

2. The invention as defined in claim 1 wherein said spraying with said alkaline solution comprises spraying with any number of particular alkaline solutions, including, but not limited to, ammonium hydroxide and calcium hydroxide.

3. Apparatus for cooling, neutralizing, and removing particulates from the acidic gaseous products of combustion, comprising in combination:

A. An initial chamber containing one or more baffle barriers to cool and slow the flow of entering combustion fumes thereby causing the heaviest particulates in the exhaust to precipitate onto the bottom of the initial chamber;

B. A second adjacent treatment chamber which is tapered at the base to a water drain valve to facilitate drainage and cleaning and connected to the first treatment chamber by a connection tube, accepting the flow of combustion fumes for cooling and purification, and comprising:
  (1) An extremely high-velocity, high-pressure water jet, monitored by a pressure gauge, located inside said first connection tube;
  (2) A second connection tube connecting the second treatment chamber with the third tapered treatment chamber;
  (3) A second extremely high-velocity, high-pressure water jet monitored by a pressure gauge, located inside the tube connecting the second treatment chamber with the third treatment chamber;
  (4) A water inlet pipe and drain valve located at the base of the second treatment chamber to maintain accumulated water level in the bottom of the second treatment chamber;
  (5) A temperature sensor and temperature gauge located at the base of the second treatment chamber;
  (6) A pipe conveying accumulated water from the bottom of the second treatment chamber to a high-velocity, centrifugal water pump;

C. An external radiator connected to said first centrifugal pump, where exhaust-heated water is conveyed to supplement the heat output of the furnace to which the present invention is attached, while cooling said water;

H. One water pipe leaving the radiator and one leaving said water pump directly, thereby recirculating pressurized water back to two separate nozzles comprising said first and second high-velocity water jets;

I. A third treatment chamber, connected to the second by said second connection tube and accepting the flow of combustion fumes for further cooling, purification, and neutralization and comprising:
  (1) An extremely high-velocity, high-pressure alkaline solution jet, monitored by a pressure gauge, located inside said second connection tube;
  (2) A third connection tube connecting the third treatment chamber with the outdoors;
  (3) A second extremely high-velocity, high-pressure alkaline jet monitored by a pressure gauge, located inside the tube connecting the third treatment chamber with the outdoors;
  (4) A water inlet pipe and float assembly located on the third treatment chamber to maintain the accumulated alkaline level in the bottom of the third treatment chamber;
  (5) A Ph sensor and temperature gauge located at the base of the third treatment chamber;
  (6) A pipe conveying accumulated alkaline solution from the bottom of the third treatment chamber to a second high-velocity, centrifugal water pump;

J. One water pipe leaving the said second water pump directly, thereby recirculating pressurized alkaline solution back to two separate nozzles comprising said first and second high-velocity alkaline jets.

* * * * *